(12) United States Patent
Kagekata et al.

(10) Patent No.: US 6,397,848 B1
(45) Date of Patent: Jun. 4, 2002

(54) MOUTHGUARD COMPOSITION

(75) Inventors: Hiroyuki Kagekata; Hiroshi Kamohara, both of Tokyo (JP)

(73) Assignee: GC Corporation, Tokyo (JP)

( * ) Notice: Subject to any disclaimer, the term of this patent is extended or adjusted under 35 U.S.C. 154(b) by 0 days.

(21) Appl. No.: 09/632,931

(22) Filed: Aug. 4, 2000

(30) Foreign Application Priority Data

Aug. 18, 1999 (JP) .......................................... 11-231691

(51) Int. Cl.[7] .............................. A61C 7/00; C08L 83/04
(52) U.S. Cl. ...................... 128/862; 525/479; 525/100; 525/106; 525/95; 554/227; 560/128; 523/105; 523/109
(58) Field of Search .................. 128/862; 525/479, 525/100, 106, 95; 554/227; 560/128; 523/105, 109

(56) References Cited

U.S. PATENT DOCUMENTS

| | | | |
|---|---|---|---|
| 5,169,887 A | * | 12/1992 | Snow et al. |
| 5,364,898 A | * | 11/1994 | Lee, Jr. et al. |
| 5,378,271 A | * | 1/1995 | Arimoto et al. |
| 5,397,822 A | * | 3/1995 | Lee, Jr. |

* cited by examiner

*Primary Examiner*—Robert Dawson
*Assistant Examiner*—Kuo-Liang Peng
(74) *Attorney, Agent, or Firm*—Oblon, Spivak, McClelland, Maier & Neustadt, P.C.

(57) ABSTRACT

A mouthguard composition is disclosed, containing (a) from 40 to 80% by weight of a styrene block copolymer, (b) from 20 to 60% by weight of an alicyclic saturated hydrocarbon resin and/or an ester gum, and (c) from 0.1 to 10% by weight of an organopolysiloxane in which at least one of organic groups directly bound to the silicon atom in one molecule thereof is a phenyl group, a methylstyryl group, or an alkyl group having from 7 to 30 carbon atoms. The mouthguard composition is high in durability and impact absorption and is free from sticking to gypsum model or hands and fingers at the time of preparation and adjustment works.

20 Claims, No Drawings

MOUTHGUARD COMPOSITION

BACKGROUND OF THE INVENTION

1. Field of the Invention

The present invention relates to a mouthguard composition for preventing teeth and their surrounding oral tissues from a trauma occurred in a sport and so on.

2. Description of the Conventional Art

In contact sports such as rugby football and American football, a large external force may be applied to a head during the game. In order to confine a trauma on teeth and their surrounding oral tissues occurred at that time to the minimum, a mouthguard made of a rubber material, or an appliance called as a mouth protector or the like, is set in an oral cavity, thereby protecting the teeth and their surrounding oral tissues from the external force.

For the mouthguard, various materials are employed. Those that are most widely used at the present time are polyolefin rubbers and ethylene-vinyl acetate copolymers. In addition, a mouthguard comprising an ethylene-vinyl acetate copolymer having a thermoplastic polycaprolactone added thereto, as disclosed in Japanese Patent No. 2,594,830, is used.

However, in mouthguards prepared from such a material, when a large occlusal force is applied, the materials themselves are liable to be broken so that these mouthguards could be used only a few times. In particular, in a so-called "custom-made" mouthguard that a dentist makes according to the shape of an oral cavity of an individual for whom the mouthguard is set, it is required to have durability from the economic standpoint. Accordingly, it was a problem that the mouthguard was broken within a comparatively short period of time and could be no longer used.

Further, in order to get a necessary impact absorption force, the conventional mouthguards are required such that their thickness is made thick. When such thick mouthguard is set in the oral cavity, the occlusion site rises from the usual site, whereby not only the setting feeling was unpleasant, but also the jaw oral cavity was likely adversely affected.

As a matter of course, since the shape of the oral cavity is different one by one, it is necessary to prepare and adjust the mouthguard according to the individual. For this reason, the preparation and adjustment of the mouthguard are generally carried out by heating and softening a material at approximately 80° C. At this time, the conventional mouthguards are liable to be sticky to gypsum model or hands and fingers of an operator to be used for the preparation and adjustment. Thus, it has been demanded to realize a material for mouthguard that is less sticky.

SUMMARY OF THE INVENTION

The present invention is aimed to provide a mouthguard composition having high durability and impact absorption, which is free from sticking to gypsum model or hands and fingers at the time of preparation and adjustment works.

We, the present inventors, paid attention to a styrene block copolymer that is superior in tear strength to the conventional ethylene-vinyl acetate copolymers or polyolefin rubber materials. As a result, they have completed a mouthguard composition according to the present invention, in which the styrene block copolymer is added with an alicyclic saturated hydrocarbon resin and/or an ester gum for the purpose of imparting impact absorption and softening characteristics at low temperatures required for the mouthguard and further with an organopolysiloxane in which at least one of organic groups directly bound to the silicon atom in one molecule thereof is a phenyl group, a methylstyryl group, or an alkyl group having from 7 to 30carbon atoms for the purpose of reducing the stickiness at the time of works.

Specifically, the mouthguard composition according to the present invention comprises:

(a) from 40 to 80% by weight of a styrene block copolymer, (b) from 20 to 60% by weight of an alicyclic saturated hydrocarbon resin and/or an ester gum, and (c) from 0.1 to 10% by weight of an organopolysiloxane in which at least one of organic groups directly bound to the silicon atom in one molecule thereof is a phenyl group, a methylstyryl group, or an alkyl group having from 7 to 30 carbon atoms.

DETAILED DESCRIPTION OF THE INVENTION

The styrene block copolymer as the component (a) of the present invention is a component as a basis for imparting durability and elasticity to the mouthguard. Examples of the styrene block copolymer that can be used in the present invention include a block copolymer of polystyrene and polybutadiene, a block copolymer of polystyrene and polyisoprene, and a block copolymer of polystyrene and a polyolefin. Of these is mostly preferable the block copolymer of polystyrene and a polyolefin from the reasons including the hardness and softening temperature required as the mouthguard. It is necessary that the content of this styrene block copolymer in the mouthguard composition is in the range of from 40 to 80% by weight. When the content of the styrene block copolymer is less than 40% by weight, the hardness as the mouthguard is insufficient. On the other hand, when it exceeds 80% by weight, the softening temperature of the mouthguard composition rises so that the preparation and adjustment are difficult.

The alicyclic saturated hydrocarbon resin and/or the ester gum as the component (b) of this invention is a component having effects for not only improving the impact absorption of the mouthguard but also lowering the softening temperature to make the preparation and adjustment easy. Though a number average molecular weight of the alicyclic saturated hydrocarbon that can be used in the present invention is generally from 500 to 900, it is most preferably from 550 to 650 for the purpose of controlling the softening temperature to a proper extent. On the other hand, as the ester gum, one prepared by esterifying rosin with glycerin is generally used, but one prepared by esterifying hydrogenated rosin with glycerin can also be used. The alicyclic saturated hydrocarbon resin and the ester gum can be used singly or in admixture, and the content thereof in the mouthguard composition is required to be from 20 to 60% by weight. When the content of the component (b) is less than 20% by weight, the impact absorption is not sufficient, and the softening temperature becomes higher, so that the preparation is difficult. On the other hand, when it exceeds 60% by weight, the resulting product is liable to be deformed by occlusal force, leading to a reduction in the durability of the mouthguard.

The organopolysiloxane in which at least one of organic groups directly bound to the silicon atom in one molecule thereof is a phenyl group, a methylstyryl group, or an alkyl group having from 7 to 30 carbon atoms as the component (c) of the present invention has an effect for reducing the stickiness to gypsum model or hands and fingers occurred during the preparation and adjustment of the mouthguard.

Representative examples of the organopolysiloxane in which at least one of organic groups directly bound to the silicon atom in one molecule thereof is a phenyl group, a methylstyryl group, or an alkyl group having from 7 to 30 carbon atoms that can be used in the present invention include methylphenyl dimethylpolysiloxane, methylstyryl-modified dimethylpolysiloxane, and dimethylpolysiloxane modified with an alkyl group having 8 carbon atoms. The amount of the component (c) to be compounded in the mouthguard composition is required to be from 0.1 to 10% by weight. When the amount of the component (c) is less than 0.1% by weight, the effect for preventing the stickiness to gyp sum model or hands and fingers during the preparation and adjustment is not sufficient. On the other hand, when it exceeds 10% by weight, the component (c) bleeds out from the surface of the mouthguard, and the deformation of the mouthguard or the like is liable to occur.

In addition, the mouthguard composition according to the present invention may be added with an inorganic or organic coloring agent, a bactericide, an ultraviolet light absorber, etc. so far as the characteristics are not lost.

The mouthguard composition according to the present invention is described in more detail with reference to the following Examples. It is not to be construed that the invention is limited thereto.

EXAMPLE 1

| | |
|---|---|
| Block copolymer of polystyrene and polyolefin: | 60% by weight |
| Alicyclic saturated hydrocarbon resin (number average molecular weight: 570): | 28% by weight |
| Ester gum (glycerin ester of rosin): | 10% by weight |
| Methylstyryl-modified dimethylpolysiloxane: | 2% by weight |

The above components were heated and kneaded in a pressure kneader at 110 to 120° C., and the mixture was formed into a disc having a thickness of 5 mm and a diameter of 100 mm.

The tear strength and impact absorption of the mouthguard composition formed into the disc as well as the stickiness to a gypsum model or hands and fingers during preparation of a mouthguard at 80° C. using the mouthguard composition in the disc shape were examined in the following measurement methods. The results obtained in each of the tests are summarized in Table 1.

(1) Tear strength:

Using a B type in "Tear testing method of vulcanized rubber" as defined in JIS K6252, the tear strength was measured at a crosshead speed of 500 mm/min by means of a universal testing machine (a trade name: Autograph, manufactured by Shimadzu Corporation).

(2) Impact absorption:

On a load cell was dropped an iron ball having a weight of 1 kg from a position of 500 mm high, to measure an impact force A as a basis. Then, the mouthguard composition in the disc shape was put on the load cell, and the iron ball was dropped thereon in the same manner as above, to measure an impact force B. The impact absorption means a degree of the reduction in the impact force by putting the mouthguard on the load cell and is calculated in the following manner.

$$\text{Impact absorption} = (A-B)/A$$

As this value is closed to 1, the impact absorption is large.

(3) Evaluation of stickiness to gypsum model or hands and fingers:

The mouthguard composition in the disc shape was softened by heating at 80° C. and brought into press contact with a gypsum model of maxilla of an oral cavity, thereby evaluating the degree of stickiness to the gypsum model or hands and fingers.

EXAMPLE 2

| | |
|---|---|
| Block copolymer of polystyrene and polyolefin: | 70% by weight |
| Ester gum (glycerin ester of rosin): | 22% by weight |
| Methylphenyl dimethylpolysiloxane: | 8% by weight |

A mouthguard composition composed of the above components was formed into a disc in the same manner as in Example 1 and then subjected to the same tests as in Example 1. The results obtained are shown in Table 1.

EXAMPLE 3

| | |
|---|---|
| Block copolymer of polystyrene and polyisoprene: | 40% by weight |
| Alicyclic saturated hydrocarbon resin (number average molecular weight: 570): | 59.5% by weight |
| Methylstyryl-modified dimethylpolysiloxane: | 0.5% by weight |

A mouthguard composition composed of the above components was formed into a disc in the same manner as in Example 1 and then subjected to the same tests as in Example 1. The results obtained are shown in Table 1.

Comparative Example 1

A commercially available mouthguard using an ethylene-vinyl acetate copolymer (a trade name: +αMouth Guard, made by Sun Medical Co., Ltd.) was heated at 80° C. and formed into a disc having the same shape as in Example 1. The thus formed mouthguard in a disc shape was then subjected to the same tests as in Example 1. The results obtained are shown in Table 1.

Comparative Example 2

As the mouthguard composition disclosed in Japanese Patent No. 2,594,830, a mouthguard composition composed of 90.5% by weight of an ethylene-vinyl acetate copolymer (content of vinyl acetate: 25% by weight) and 9.5% by weight of a thermoplastic polycaprolactone (average molecular weight: 40,000) was prepared and formed into a disc having the same shape as in Example 1. The formed disc was then subjected to the same tests as in Example 1. The results obtained are shown in Table 1.

Comparative Example 3

A block copolymer of polystyrene and a polyolefin was heated at 80° C. and formed into a disc having the same shape as in Example 1. The mouthguard composition formed in the disc was subjected to the same tests as in Example 1. The results obtained are shown in Table 1.

TABLE 1

| | Example 1 | Example 2 | Example 3 | Comparative Example 1 | Comparative Example 2 | Comparative Example 3 |
|---|---|---|---|---|---|---|
| Tear strength (kgf/cm) | 39.5 | 41.6 | 38.4 | 21.2 | 22.4 | 42.2 |
| Impact absorption | 0.33 | 0.35 | 0.41 | 0.14 | 0.10 | O.13 |
| Stickiness to gypsum model or hands and fingers | Not sticky | Not sticky | Not sticky | Slightly sticky | Slightly sticky | Sticky |

As is clear from Table 1, it can be confirmed that the mouthguards prepared from the mouthguard composition according to the present invention are high in the tear strength and impact absorption and are not sticky to the gypsum model or hands and fingers at the time of the preparation and adjustment, as compared with the mouthguards composed of an ethylene-vinyl acetate copolymer as a major component in Comparative Examples 1 and 2.

On the other hand, Comparative Example 3 is a working example in which the mouthguard was prepared from only a styrene block copolymer. Though the mouthguard in Comparative Example 3 is high in the tear strength, not only it is low in the impact absorption because it does not contain the alicyclic saturated hydrocarbon resin and/or the ester gum as the component (b) of the present invention, but also it is high in the stickiness to the gypsum model or hands and fingers because it does not contain the organopolysiloxane in which at least one of organic groups directly bound to the silicon atom in one molecule thereof is a phenyl group, a methylstyryl group, or an alkyl group having from 7 to 30 carbon atoms as the component (c) of the present invention.

As described above in detail, the mouthguard composition according to the present invention is superior not only in the durability because of its high tear strength but also in the impact absorption, thereby more enhancing the impact absorptive function as a mouthguard. Therefore, with the mouthguard composition of the present invention, the thickness of the mouthguard can be made thinner so far as the impact absorption is equivalent to that of the conventional mouthguards. In addition, since it is free from the stickiness to the gypsum model or hands and fingers at the time of the preparation and adjustment, there gives rise to an effect for making the preparation and adjustment easy.

In the light of the above, the mouthguard composition according to the present invention gives rise to an effect for preventing teeth and their surrounding oral tissues from a trauma occurred in a sport. Further, it enables a dentist or dental technician to easily prepare and adjust a so-called "custom-made" mouthguard according to the shape of an oral cavity that is different one by one. Thus, the value of this invention contributing to the sport field as well as the dental field is very high.

While the invention has been described in detail and with reference to specific embodiments thereof, it will be apparent to one skilled in the art that various changes and modifications can be made therein without departing from the spirit and scope thereof.

What is claimed is:

1. A composition comprising:
   (a) from 40 to 80% by weight of a styrene block copolymer,
   (b) from 20 to 60% by weight of an alicyclic saturated hydrocarbon resin and/or an ester gum, and
   (c) from 0.1 to 10% by weight of an organopolysiloxane in which at least one of organic groups directly bound to the silicon atom in one molecule thereof is a phenyl group, a methylstyryl group, or an alkyl group having from 7 to 30 carbon atoms.

2. The composition as claimed in claim 1, wherein the styrene block copolymer as the component (a) is a block copolymer of polystyrene and a polyolefin.

3. The composition as claimed in claim 1 or 2, wherein the alicyclic saturated hydrocarbon resin and/or the ester gum as the component (b) is an alicyclic saturated hydrocarbon resin having a number average molecular weight of from 550 to 650 and/or an ester gum comprising rosin esterified with glycerin.

4. The composition as claimed in claim 1, wherein the organopolysiloxane as the component (c) is any one of methylphenyl dimethylpolysiloxane, methylstyryl-modified dimethylpolysiloxane, and dimethylpolysiloxane modified with an alkyl group having 8 carbon atoms.

5. A mouthguard comprising the composition claimed in claim 1.

6. A mouthguard comprising the composition claimed in claim 2.

7. A mouthguard comprising the composition claimed in claim 3.

8. A mouthguard comprising the composition claimed in claim 4.

9. The composition as claimed in claim 1, further comprising an additive selected from the group consisting of an inorganic coloring agent, an organic coloring agent, a UV light absorber and a bactericide.

10. A method of preparing the composition claimed in claim 1, comprising mixing components (a), (b) and (c), then kneading in a pressure kneader at a temperature from 110° C. to 120° C.

11. The composition as claimed in claim 1, comprising 60% by weight styrene block copolymer, 28% by weight alicyclic saturated hydrocarbon resin, 10% by weight ester gum and 2% by weight organopolysiloxane, wherein said ester gum is glycerin ester of rosin and said organopolysiloxane is methylstyryl-modified dimethylpolysiloxane.

12. The composition as claimed in claim 1, comprising 70% by weight styrene block copolymer, 22% by weight ester gum and 8% by weight organopolysiloxane, wherein said ester gum is glycerin ester of rosin and said organopolysiloxane is methylstyryl-modified dimethylpolysiloxane.

13. The composition as claimed in claim 1, further comprising polyisoprene.

14. The composition as claimed in claim 1, wherein the alicyclic saturated hydrocarbon resin has a number average molecular weight of about 570.

15. The composition as claimed in claim 1, comprising an alicyclic saturated hydrocarbon resin.

16. The composition as claimed in claim 1, comprising an ester gum.

17. The composition as claimed in claim 1, comprising an alicyclic saturated hydrocarbon resin and an ester gum.

18. The composition as claimed in claim 1, comprising an organopolysiloxane wherein at least one of the groups bound directly to the silicon atom is a phenyl group.

19. The composition as claimed in claim 1, comprising an organopolysiloxane wherein at least one of the groups bound directly to the silicon atom is a methylstyryl group.

20. The composition as claimed in claim 1, comprising an organopolysiloxane wherein at least one of the groups bound directly to the silicon atom is an alkyl group.

\* \* \* \* \*